United States Patent Office 2,830,184
Patented Apr. 8, 1958

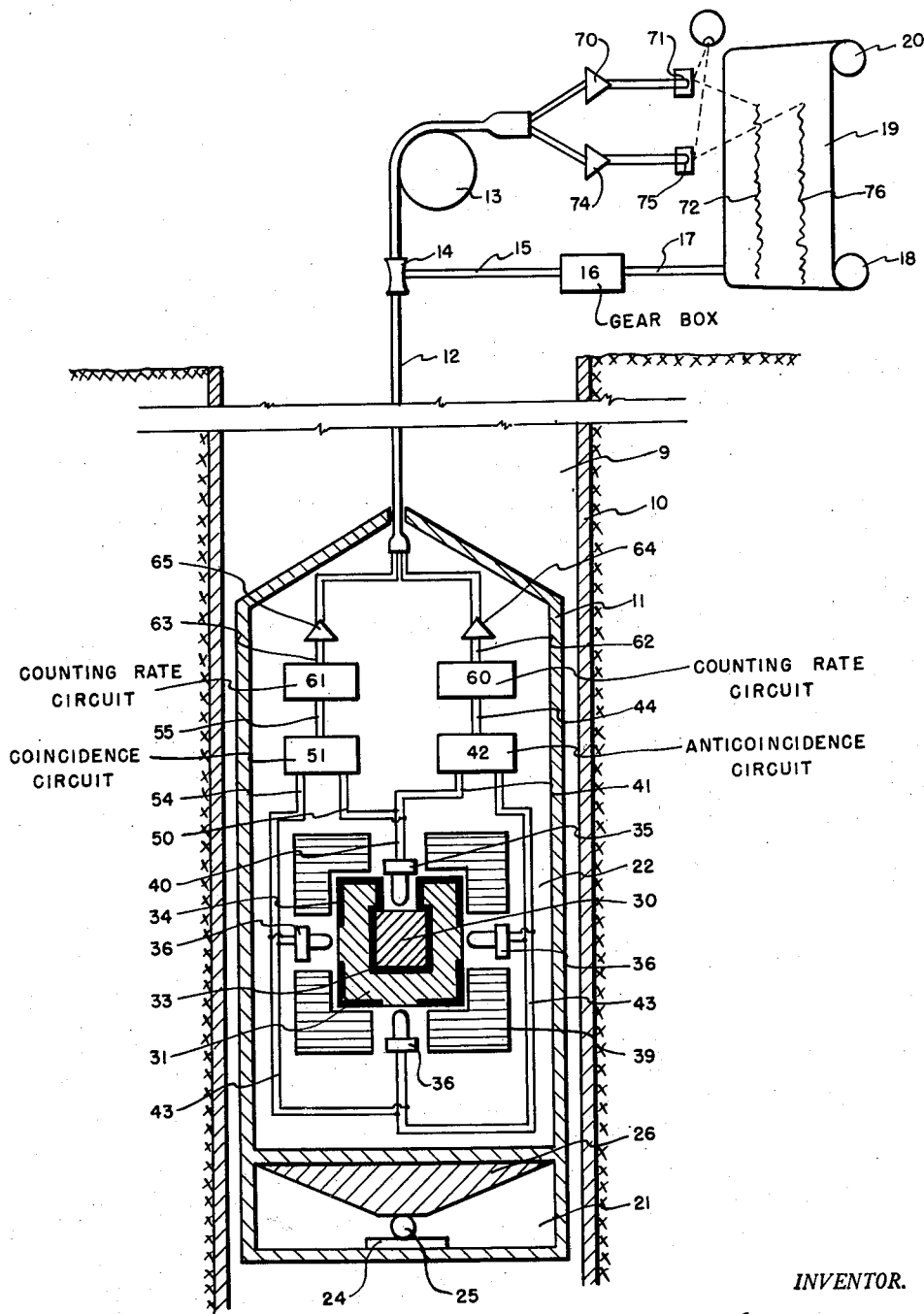

2,830,184

RADIATION DETECTOR

Serge A. Scherbatskoy, Tulsa, Okla., assignor, by mesne assignments, to PGAC Development Co., Houston, Tex., a corporation of Texas Application December 24, 1953, Serial No. 400,280

5 Claims. (Cl. 250—71)

This invention is concerned with a radiation detector for measuring fast neutrons. It is particularly related to a radiation detector for performing in a bore hole measurements of neutrons and involving the use of a neutron source for radiating neutrons into the formations adjoining said bore hole.

The neutrons emitted by said source possess a wide range of energy extending to 10 m. e. v. and they undergo numerous collisions during their passage through the formations. As a result of these collisions, the energy of neutrons is gradually degraded and numerous gamma rays are produced in the formation. Thus a detector placed in the bore hole is exposed to heterogeneous radiations comprising a mixture of gamma rays and neutrons, said neutrons covering a wide range of energies extending from about 10 m. e. v. down to thermal values of 0.025 m. e. v.

Many measurements have been made of the above radiations, and particularly of gamma radiation. These measurements when correlated with depth provided a log commonly designated as neutron-gamma ray log.

Various attempts have been made in the past to lower in the bore hole a source of neutrons accompanied with a detector of fast neutrons in order to obtain a neutron-fast neutron log. These attempts have been unsucessful because of the difficulty of measuring fast neutrons without the background of gamma rays.

It is an object of this invention to provide a radiation detector for measuring fast neutrons in the presence of a gamma ray background.

It is another object of this invention to provide a neutron-fast neutron log.

It is another object of this invention to obtain simultaneously by means of a single and common detector the separate measurement of neutrons and gamma rays and thus to obtain simultaneously a neutron-gamma ray and neutron-fast neutron log.

It is another object of the present invention to provide an improved method and improved apparatus for determining the character of unknown substances adjacent to a bore hole.

For further details of specific devices embodying the principles of this invention and for a more complete understanding of the mode of application of the principles of this invention and the numerous advantages thereof, reference may be made to the accompanying drawing which illustrates diagrammatically a bore hole which penetrates the strata of the earth, and the general arrangement for logging the bore hole by simultaneously measuring neutrons and gamma rays.

Referring now to the drawing, there is schematically illustrated a drill hole 9 penetrating the formations to be explored. The drill hole is defined in the conventional manner by a tubular metallic casing designated by 10. For the purpose of exploring the formations along the bore hole there is provided in accordance with the present invention exploratory apparatus comprising a housing 11 which is lowered into the bore hole 9 by means of a cable 12, including as a part thereof suitable insulated conductors. The cable 12 has a length somewhat in excess of the depth of the bore hole to be explored and is normally wound on a drum 13 to lower the exploring apparatus into the bore hole 9 and may be rewound upon the drum 13 to raise the exploring apparatus.

In order to determine the depth of the exploratory apparatus within the bore hole 9 at any time, there is provided a measuring wheel 14 engaging the cable 12 above the top of the bore hole and adjusted to roll on the cable in such a manner that the number of revolutions of the reel 14 corresponds to the amount of cable which has moved past the reel in either direction. The reel 14 is mounted on a shaft 15, and rotation of the reel and consequently of the shaft 15 is transmitted through a gear box 16 to another shaft 17 which is drivingly connected to take up spool 18 for moving a photographic film 19 from a feed spool 20 to the take up spool 18.

The housing 11 of the exploratory apparatus is divided into two sections designated by numerals 21 and 22, respectively. In the section 21 there is provided a solid support 24 on which is disposed a suitable source of neutrons generally designated as 25, such for example as radium beryllium preparation, which may be enclosed in a container made of a suitable material such as glass. Instead of radium beryllium preparation, the source of neutrons may comprise, for example, a discharge tube adapted to bombard a beryllium or lithium composition with deuterons, thus causing a generation of neutrons in a manner understood by those skilled in the art.

The radiations transmitted from the source 25 tend to propagate themselves in all directions. I have provided, however, an absorbing block 26 formed of materials for example, such as lead and paraffin which is relatively opaque to penetrating radiations, the paraffin being relatively opaque to other radiations. I have, therefore, prevented a direct path between the source 25 and the detecting instrument positioned above the block 26. Consequently, the radiations emitted by the source 25 are directed sideways into the adjoining formations and the amount of radiation going upwards through the absorbing block is negligible.

The radiation detector located above the block 26 is of scintillation counter type and comprises crystals in combination with photomultipliers. The crystals are adapted to convert the incoming radiation into impulses of light which subsequently impinge upon the corresponding photomultipliers provided with suitable voltage supplies. We obtain thus across the output terminals of such photomultipliers current impulses which coincide with the arrival of gamma rays. More particularly, the detector comprises an anthacene crystal 30 completely surrounded by a relatively larger sodium iodide crystal 31. The crystal 30 has its outside surface covered with an aluminum reflector 33, whereas the crystal 31 has its inside surface covered with aluminum reflector 33 and outside surface covered with aluminum reflector 34. The light flashes produced in the crystal 30 are adapted to be transmitted by means of the reflector 33 to a photomultiplier provided with a suitable voltage supply, the combined photomultiplier and voltage supply being designated as 35. Similarly, the light flashes produced in the crystal 31 are adapted to be transmitted by means of reflectors 33, 34 to one or more photomultipliers 36 (provided with voltage supplies), said photomultipliers 36 being connected in parallel. The crystals 30 and 31 are optically separated one from the other by the aluminum layer 33. Thus a light flash in the crystal 31 does not affect the photomultiplier 35, and a light flash in the crystal 30 does not affect any of the photomultipliers 36.

The detector is surrounded by a tungsten shield 39, the purpose of which is to shield the detector from soft gamma rays and X-rays.

The output of the photomultiplier 35 is connected through lead 41 to one of the input channels of an anticoincidence circuit 42, the other input channel of said circuit being connected to the output of the photomultipliers 36 through leads 43. The anticoincidence circuit is adapted to produce a current pulse across its output leads 44 whenever a pulse is produced in the output of the photomultiplier 35, but there is no simultaneous pulse in the output in any of the photomultipliers 36.

Similarly, the output of the photomultiplier 35 is connected through leads 50 to one of the input channels of a coincidence circuit 51, the other input channel of said circuit being connected to the output of the photomultiplier 36 through leads 54 and 43. The coincidence circuit is adapted to produce a current pulse across its output leads 55 whenever pulses are simultaneously produced in the outputs of the photomultipliers 35 and any of the photomultipliers 36. Coincidence and anticoincidence circuits are well known in the art. See for instance, E. Segre, "Experimental Nuclear Physics," John Wiley & Sons, New York, N. Y., 1953, pp. 104–108.

The output leads 44 and 55 are applied to the counting rate circuits 60 and 61, respectively. Thus we obtain across the output leads 62 of the circuit 60 a D. C. voltage having magnitude representing the frequency of impulses produced by the anticoincidence circuit 42. Similarly, we obtain across the output leads 63 of the circuit 61 a D. C. voltage having magnitude representing the frequency of impulses produced by the coincidence circuit 51. The leads 62 and 63 are in turn applied through the amplifiers 64 and 65 to the cable 12.

The radiations emitted by the source 25 interact with the formations and as a result of such interaction a mixture of neutrons and gamma rays impinge upon the detector. Some of these radiations, and namely soft gamma rays and X-rays, are absorbed by the shield 39 and consequently the radiations that interact with the scintillation crystals comprise mainly gamma rays of medium and high energy and neutrons.

It is well known that neutrons and gamma rays do not interact in the same manner with any scintillation crystal. Some crystals such as the anthracene crystal 30 respond to both neutrons and gamma radiation and the electrical impulses resulting from these radiations are substantially in the ratio 3:1, i. e. an impulse caused by a gamma ray is about 3 times larger than the one caused by a neutron of the same energy. Other crystals, such as the sodium iodide crystal 31 respond only to gamma rays and are insensitive to neutrons.

We shall consider now in particular the interaction of the incoming radiation with the anthracene crystal 30. It is well known that neutron and gamma rays do not interact directly with the crystal 30 and the interaction process is different for neutrons and for gamma rays. Furthermore, the gamma rays interact with the crystal in three different ways: by photoelectric effect, Compton effect, and pair formation. We shall separately consider each of these interaction processes:

An incoming fast neutron strikes one of the nuclei of anthracene, such as a nucleus of hydrogen, in which case the nucleus recoils as a proton, thus producing a pulse of light in the crystal 30, said light producing in turn a current impulse in the output of the photomultiplier 35. The incoming neutron is in turn scattered by the nucleus of anthracene and the scattered neutron usually escapes from the crystal 30 and traverses the crystal 31. Since the crystal 31 is sodium iodide, it does not respond to neutrons and therefore there is no pulse in the ouput of any of the photomultipliers 36. Consequently, a fast neutron collision in the crystal 30 is characterized by the occurrence of a pulse in the photomultiplier 35 while the photomultiplier 36 produces no simultaneous pulse. As explained above, such an occurrence is characterized by a pulse across the output leads of the anticoincidence circuit 42. Thus the output voltage of the counting rate circuit 60 represents the rate of occurrence of fast neutrons traversing the crystal 30. This voltage is transmitted through the amplifier 64, cable 12, amplifier 70 to the galvanometer coil 71 and produces in a manner well known in the art a trace 72 upon the photosensitive film 19, said trace representing the number of incoming fast neutrons detected per second at various depths of the hole.

The number of photoelectric interactions in the crystal 30 is negligible since anthracene is comprised of atoms of low atomic number and because of the effect of the shield 39 which absorbed most of low energy gamma rays and X-rays.

In the Compton interaction the incoming photon is scattered by one of the electrons of the crystal 30. As a result of such scattering the electron has acquired kinetic energy, thus producing a pulse of light in the crystal 30, said light producing in turn a current impulse in the output of the photomultiplier 35. The scattered photon usually escapes from the crystal 30 and interacts with the crystal 31. As a result of such interaction, we obtain in the crystal 31 a flash of light which in turn produces a current pulse in at least one of the photomultipliers 36. Consequently, the Compton effect is characterized by a simultaneous occurrence of pulses in the photomultipliers 35 and 36.

In the process of pair formation the incoming photon vanishes completely and a positron electron pair is created in the crystal 30. Both the electron and the positron slow down producing ionization and excitation of surrounding atoms, thus causing a flash of light in the crystal 30 and a corresponding current impulse in the output of the photomultiplier 35. After the positron has been reduced in energy, it makes a unique and final interaction with an orbital electron. In this interaction the pair of positive and negative electrons unite and annihilate themselves in the formation of two photons that are ejected in opposite directions. These photons designated as annihilation quanta interact with the crystal 31 and produce an impulse in the output of at least one of the photomultipliers 36 which is coincident with the impulse in the output of the photomultiplier 35.

Consequently a pair formation and Compton effect are characterized by a simultaneous occurrence of a pulse across the output leads of the coincidence circuit 51. Since the occurrence of a photoelectric effect is very infrequent, it can be assumed that the Compton effect and the pair formation are the only interactions that take place. Thus whenever a gamma ray traverses the crystal 30, we obtain a pulse across the leads 55 and, therefore, the output voltage of the counting rate circuit 61 represents the number of gamma rays intercepted per second by the crystal 30. This voltage is transmitted through the amplifier 65, cable 12, amplifier 74 to the galvanometer coil 75, and produces in a manner well known in the art a trace 76 upon the photosensitive film, said trace representing the number of incoming gamma rays detected per second at various depths in the hole.

It is thus apparent that I have provided by means of traces 72 and 76, respectively, a neutron-fast neutron log and a neutron gamma ray log of the formations traversed by the bore hole.

It will be obvious to those skilled in the art that numerous modifications other than those herein disclosed can be made without departing from the scope or spirit of the invention.

I claim:

1. In an apparatus for radiological logging of bore holes, a housing adapted to be lowered into a bore hole, said housing comprising a detector sensitive to neutrons and gamma rays and adapted to produce an impulse in response to a neutron or to a gamma ray, another detector surrounding said first detector, said other detector being selectively sensitive to gamma rays and insensitive to neutrons, and adapted to produce an impulse in response to a gamma ray, an anticoincidence network connected to said two detectors for providing a signal at the occurrence of an impulse at said first detector that is not simultaneous with an impulse at said second detector, a counting rate circuit connected to said network for providing a voltage representing the rate of said signals, means for determining the depth to which said housing is lowered, and means for recording the output of said counting rate circuit in correlation with depth.

2. In an apparatus for radiological logging of bore holes, a housing adapted to be lowered into a bore hole, said housing comprising a source of neutrons arranged to radiate neutrons into the formations surrounding said bore hole whereby gamma rays and neutrons are directed towards said bore hole as a result of interaction of said neutrons with said formations, a detector conveniently distant from said source, said detector being sensitive to neutrons and gamma rays and adapted to produce an impulse in response to a neutron or to a gamma ray, another detector surrounding said first detector, said other detector being selectively sensitive to gamma rays and insensitive to neutrons and adapted to produce an impulse in response to a gamma ray, an anticoincidence network connected to said two detectors for providing an output signal at the occurrence of an impulse at said first detector that is not simultaneous with an impulse at said second detector, a counting rate circuit connected to said anticoincidence network for providing a voltage representing the rate of occurrence of its output signals, means for determining the depth to which said housing is lowered and means for recording the output of said circuit in correlation with depth.

3. In an apparatus for radiological logging of bore holes, a housing adapted to be lowered into a bore hole, said housing comprising a source of neutrons arranged to radiate neutrons into the formations surrounding said bore hole, whereby gamma rays and neutrons are directed towards said bore hole as a result of interaction of said neutrons with said formations, a detector conveniently distant from said source, said detector being sensitive to neutrons and gamma rays and adapted to produce an impulse in response to a neutron or to a gamma ray, another detector surrounding said first detector, said other detector being selectively sensitive to gamma rays and insensitive to neutrons and adapted to produce an impulse in response to a gamma ray, an anticoincidence network connected to said two detectors for providing an output signal at the occurrence of an impulse at said first detector that is not simultaneous with an impulse at said second detector, a counting rate circuit connected to said anticoincidence network for providing a voltage representing the rate of occurrence of its output signals, a coincidence network connected to said two detectors for providing an output impulse at a simultaneous occurrence of an impulse at said two detectors, another counting rate circuit connected to said coincidence network for providing a voltage representing the rate of occurrence of its output impulses, means for determining the depth to which said housing is lowered and means for separately recording the outputs of said two circuits in correlation with depth.

4. In an apparatus for radiological logging of bore holes, a housing adapted to be lowered into a bore hole, said housing comprising a source of neutrons arranged to radiate neutrons into the formations surrounding said hole whereby gamma rays and neutrons are directed towards said hole as a result of interaction of said neutrons with said formation, a crystal conveniently distant from said source, said crystal being sensitive to neutrons and gamma rays and adapted to produce a light impulse in response to a neutron or to a gamma ray, another crystal surrounding said first crystal, said other crystal being selectively sensitive to gamma rays and insensitive to neutrons and adapted to produce a light impulse in response to a gamma ray, a first photomultiplier responsive to a light impulse in said first crystal to produce a corresponding current impulse, a second photomultiplier responsive to a light impulse in said second crystal to produce a corresponding current impulse, an anticoincidence network connected to said two photomultipliers for providing an output signal at the occurrence of a signal at said first photomultiplier that is not simultaneous with an impulse at said second photomultiplier, a counting rate circuit connected to said anticoincidence network for providing a voltage representing the rate of occurrence of its output signals, means for determining the depth to which said housing is lowered, and means for recording the output of said circuit in correlation with depth.

5. In an apparatus for radiological logging of bore holes, a housing adapted to be lowered into a bore hole, said housing comprising a source of neutrons arranged to radiate neutrons into the formations surrounding said hole whereby gamma rays and neutrons are directed towards said hole as a result of interaction of said neutrons with said formation, a crystal conveniently distant from said source, said crystal being sensitive to neutrons and gamma rays and adapted to produce a light impulse in response to a neutron or to a gamma ray, another crystal surrounding said first crystal, said other crystal being selectively sensitive to gamma rays and insensitive to neutrons and adapted to produce a light impulse in response to a gamma ray, a first photomultiplier responsive to a light impulse in said first crystal to produce a corresponding current impulse, a second photomultiplier responsive to a light impulse in said second crystal to produce a corresponding current impulse, an anticoincidence network connected to said two photomultipliers for providing an output signal at the occurrence of a signal at said first photomultiplier that is not simultaneous with an impulse at said second photomultiplier, a counting rate circuit connected to said anticoincidence network for providing a voltage representing the rate of occurrence of its output signals a coincidence network connected to said two photomultipliers for providing an output impulse at a simultaneous occurrence of an impulse at said two photomultipliers, another counting rate circuit connected to said coincidence network for providing a voltage representing the rate of occurrence of its output impulses, means for determining the depth to which said housing is lowered, and means for separately recording the outputs of said two circuits in correlation with depth.

References Cited in the file of this patent

UNITED STATES PATENTS 2,648,012     Scherbatskoy            Aug. 4, 1953

OTHER REFERENCES

Two-Crystal Gamma-Ray Scintillation Spectrometer, by R. E. Connally, from The Review of Scientific Instruments, vol. 24, No. 6, June 1953, pp. 458, 459.